United States Patent [19]

Kroll

[11] Patent Number: 5,261,385

[45] Date of Patent: Nov. 16, 1993

[54] ABRASIVE CUTTING BLADE ASSEMBLY WITH MULTIPLE CUTTING EDGE EXPOSURES

[75] Inventor: Richard H. Kroll, Longwood, Fla.

[73] Assignee: Dicing Technology Inc., Longwood, Fla.

[21] Appl. No.: 858,958

[22] Filed: Mar. 27, 1992

[51] Int. Cl.5 ............................................. B28D 1/04
[52] U.S. Cl. .................................. 125/13.01; 51/206 R
[58] Field of Search ................. 51/206 R, 207, 209 R; 125/13.01, 15, 20, 901, 3, 11.18, 12, 18; 83/676

[56] References Cited

U.S. PATENT DOCUMENTS

| | | | |
|---|---|---|---|
| 3,657,845 | 4/1972 | Sekiya | 51/206 R |
| 3,691,707 | 9/1972 | Von Arx | 51/206 R |
| 3,886,925 | 6/1975 | Regan | 125/15 |
| 4,569,326 | 2/1986 | Tanizaki | 125/13.01 |

*Primary Examiner*—Bruce M. Kisliuk
*Assistant Examiner*—Jack Lavinder

[57] ABSTRACT

An abrasive cutting blade assembly with multiple cutting edge exposures consists of a thin annular abrasive cutting blade supported by a hub or ring for mechanical support. This hub or ring is preferably made of plastic or other material that can be easily abraded away. As the diameter of the hub or ring is abraded away it will increase the amount of cutting edge or blade exposure of the cutting edge. The method of doing this is to cut into a piece of bonded abrasive material with the rotating cutting blade assembly. The bonded abrasive material will have abrasives that are of a hardness less than the abrasives in the cutting blade. In this manner, the cutting blade will penetrate the bonded abrasive material but the material of the hub or ring will be abraded away as it comes in contact with the bonded abrasive material, thereby increasing the cutting edge or blade exposure.

8 Claims, 4 Drawing Sheets

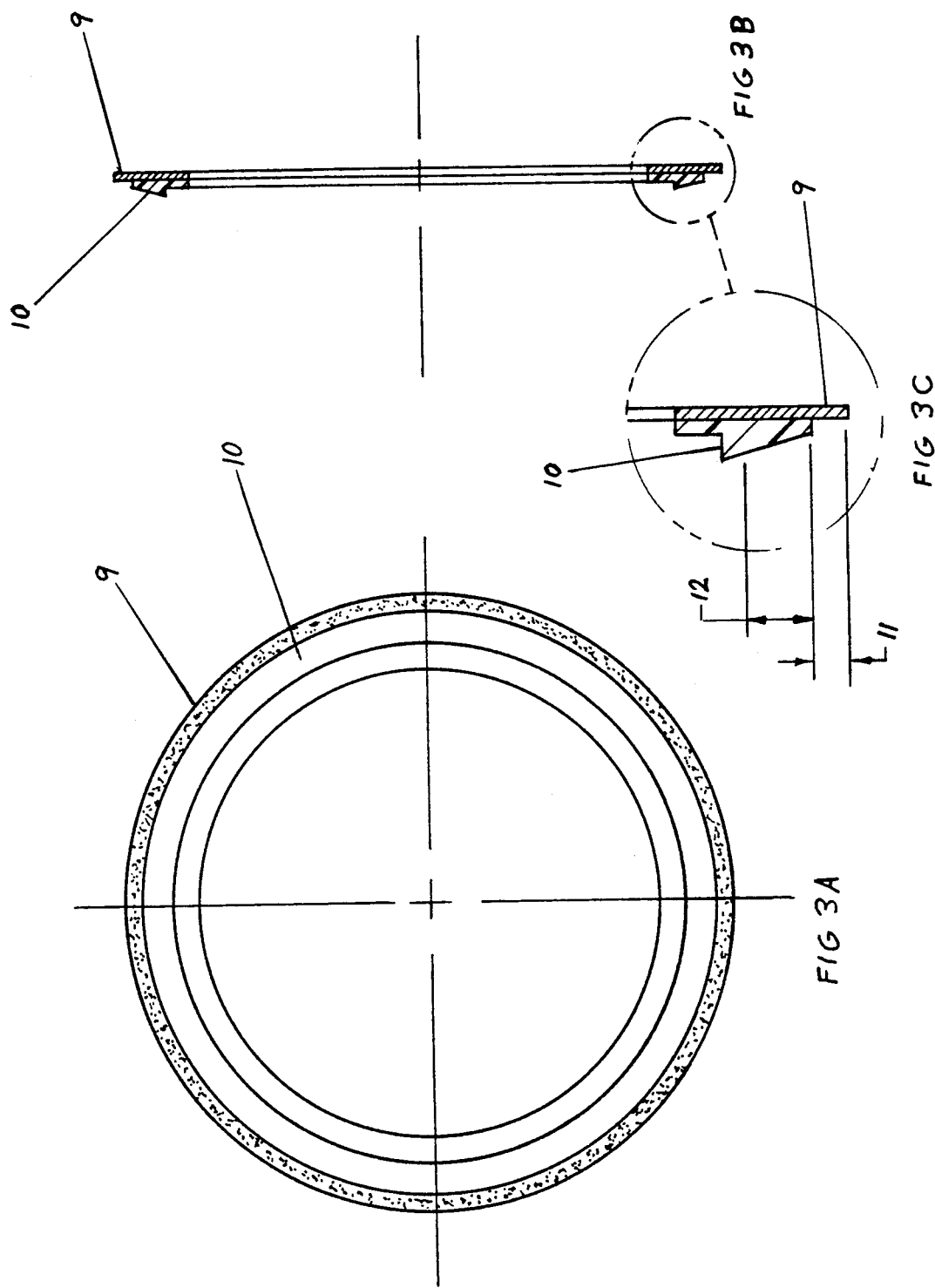

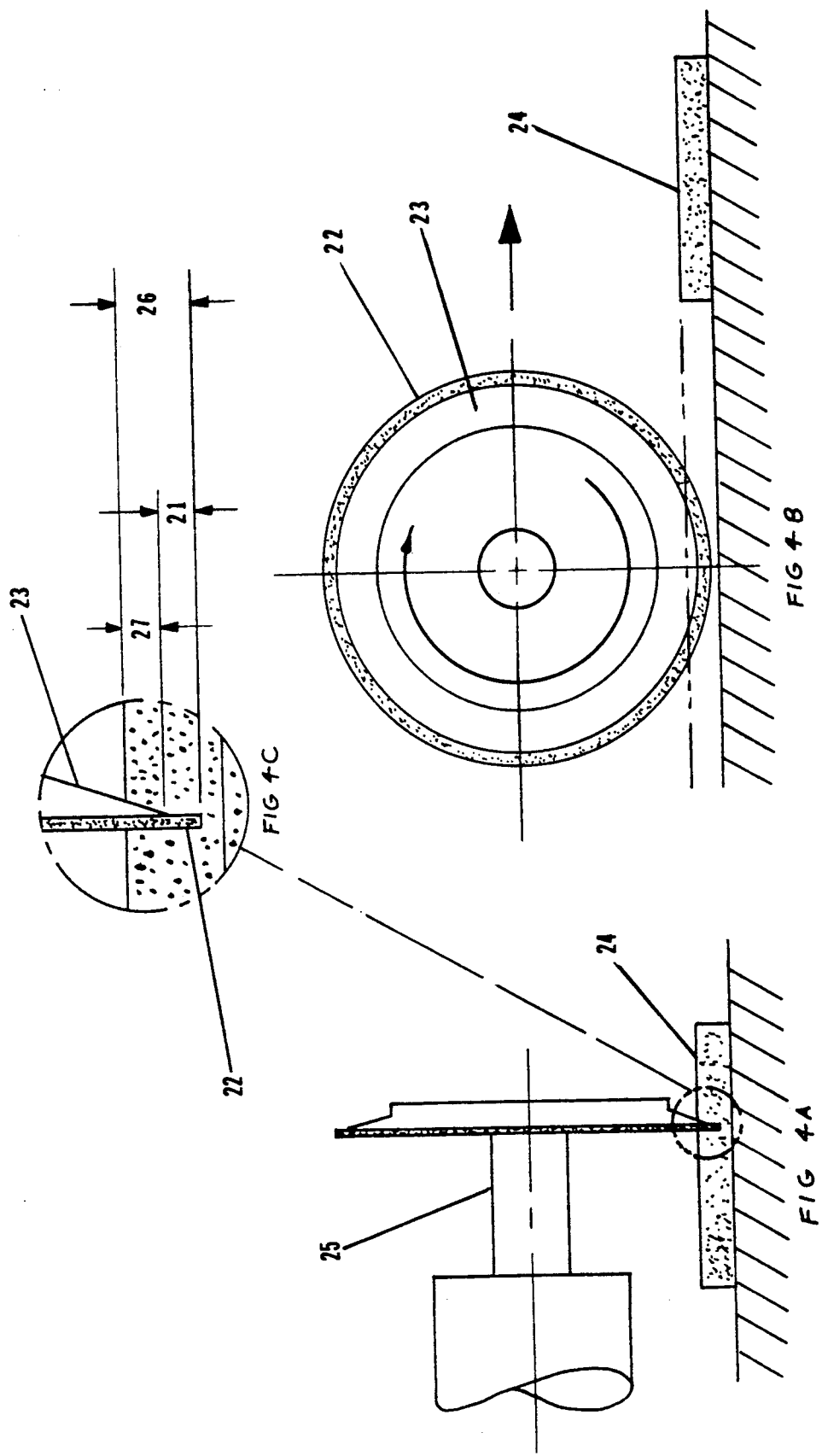

ABRASIVE CUTTING BLADE ASSEMBLY WITH MULTIPLE CUTTING EDGE EXPOSURES

BACKGROUND OF THE INVENTION

Diamond abrasive resinoid dicing blades are commonly used for cutting or dicing materials used in microelectronics and other applications. The materials are generally being diced or cut into smaller squares or rectangles or, sometimes, slotted for use in various products.

The diamond abrasive resinoid blades manufactured today are thin annular rings consisting of phenolic resin with homogeneous mixture of diamond abrasive molded in. These thin annular rings need mechanical support when they are used to cut or dice materials. These flanges or supports are currently machined from metal. A small portion of the outer diameter of the blade extends beyond the flanges or supports and is called the blade exposure or cutting edge.

Such diamond abrasive resinoid dicing blades are known as "Wear Type Blades". This terminology has been assigned to them because as the diamond abrasive becomes dull it will break away from the resin bond. In this manner, new sharp diamond abrasive will be exposed as the blade wears down in diameter. This continuous sharpening phenomena gives the diamond abrasive resinoid blade a superior cutting ability. However, one problem with current blade is that the blade and flange assembly must be removed from the machine periodically and the blade replaced on smaller diameter metal flanges, in order to maintain an usable cutting edge or blade exposure.

In order to eliminate having to remove and replace these flanges or supports, an idea was conceived to mechanically support these diamond abrasive resinoid dicing blades with a plastic or other soft material hub or ring. These hubs or rings would allow a portion of the outer diameter of the blade to extend beyond their smaller diameters. This would provide a cutting edge or blade exposure. When the blades wear down or more blade exposure is needed the hub or ring material may be abraded away or worn back. This will expose more of the blade from the edge of the hub or ring. The method of doing this is to traverse the assembly thru a dressing plate which has bonded abrasives that are less hard than the abrasives in the blade. In this manner, the blade will cut easily into the dressing plate but the material of the hub or ring will be worn or abraded away. By adjusting the depth of cut of the blade a predetermined blade exposure or cutting edge can be made. Some objects and advantages of this invention are set forth in the Summary herein below.

SUMMARY OF THE INVENTION

The primary object of the present invention is to provide a new abrasive blade that eliminates the need for additional structural supports that must be replaced during the cutting process.

Another object of the present invention is to reduce the vibration problems caused by the metal supports which are either eliminated or reduced in diameter by the present invention.

A further object of the present invention is that it allows for a blade and supporting hub or ring to be easily marked or labeled for identification as they are made together and not separated during the life of the blade.

An even further object is to reduce costs because various diameter flanges or supports are not needed to be kept in supply.

An additional object of the present invention is to provide a means wherein an exact amount of cutting edge or blade exposure needed can be produced.

Another additional object is to eliminate the need to remove the blade and supporting hub or ring from a machine in order to increase the cutting edge or blade exposure.

The present invention accomplishes the above and other objects by providing a thin annular abrasive cutting blade mechanically supported by a hub or ring made of plastic or other soft material. A portion of the outer diameter of this cutting blade extends beyond the smaller outer diameter of the hub or ring. This extension provides a cutting edge and is commonly called "Blade Exposure". The hub or ring provides mechanical support to the blade during cutting. In order to increase this "blade exposure" the blade, which is mechanically supported with the hub or ring, is made to traverse thru a dressing plate. This dressing plate contains bonded abrasives which are of a hardness less than the abrasive in the cutting blade. In this manner, the cutting blade will easily cut into the dressing plate. When the portion of the plastic or soft material hub or ring makes contact with the dressing plate it will abrade away.

By adjusting the depth of penetration of the dicing blade into the dressing plate, the blade exposure may be increased. This invention will eliminate the need of changing to smaller diameter mechanical supports to increase the blade exposure or cutting edge.

The above and other objects and advantages of the present invention will become even more apparent when a preferred embodiment is described herein below.

BRIEF DESCRIPTION OF THE DRAWINGS

FIGS. 3A, 3B and 3C show front cross sectional and enlarged views, respectively, of another embodiment of the present invention having a thin annular abrasive cutting blade incorporated with a supporting ring.

FIGS. 4A, 4B and 4C show side, front and enlarged views, respectively, of how the hub portion of the thin annular abrasive cutting blade is worn away during use to expose more of the cutting edge or blade exposure.

DETAILED DESCRIPTION OF PREFERRED EMBODIMENTS

Figure 1B:
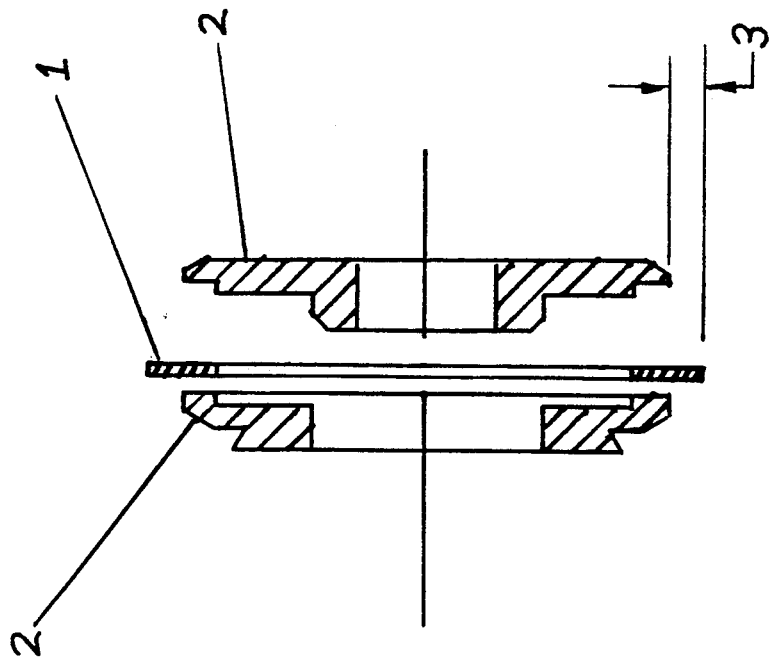
FIGS. 1A and 1B by front and cross sectional views, respectively, illustrate the present method used to support thin annular abrasive cutting blades by placing them between two flanges made of metal which must be removed and replaced with smaller diameters in order to increase the cutting edge or blade exposure.
Figure 1A:
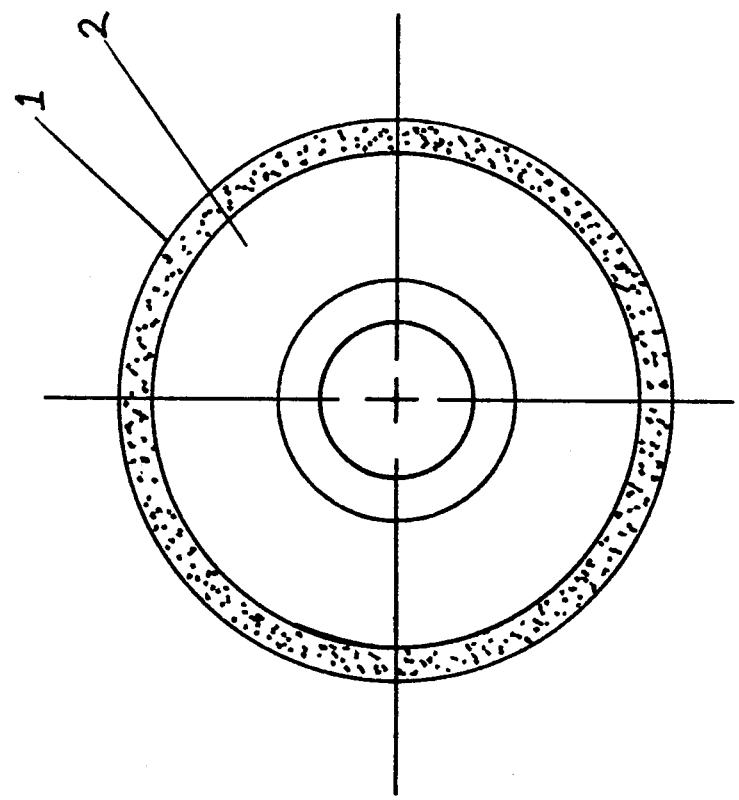

FIGS. 1A and 1B illustrate the present art used for supporting a thin annular abrasive cutting blade 1 between two metal flanges 2. The cutting edge or blade exposure 3 is the amount of the thin annular abrasive cutting blade 1 that extends beyond the edge of the metal flanges 2. The metal flanges 2 may be replaced with smaller diameter flanges to increase or maintain the cutting edge or blade exposure as the cutting blade wears.

Figure 2B:
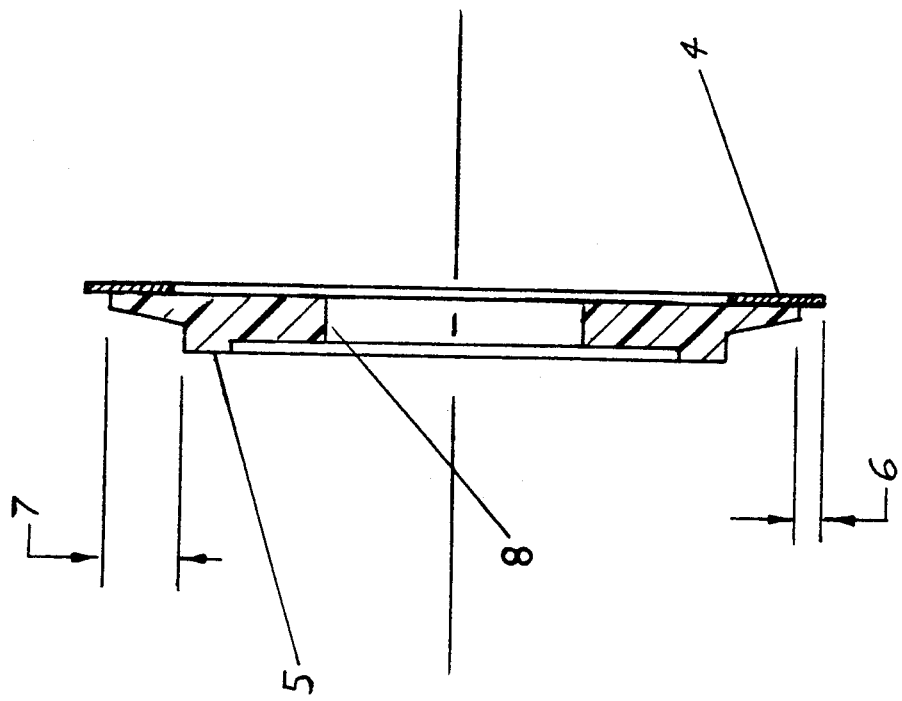
FIGS. 2A and 2B show front cross sectional views, respectively, of the present invention having a thin annular abrasive blade incorporated with a supporting hub.
Figure 2A:
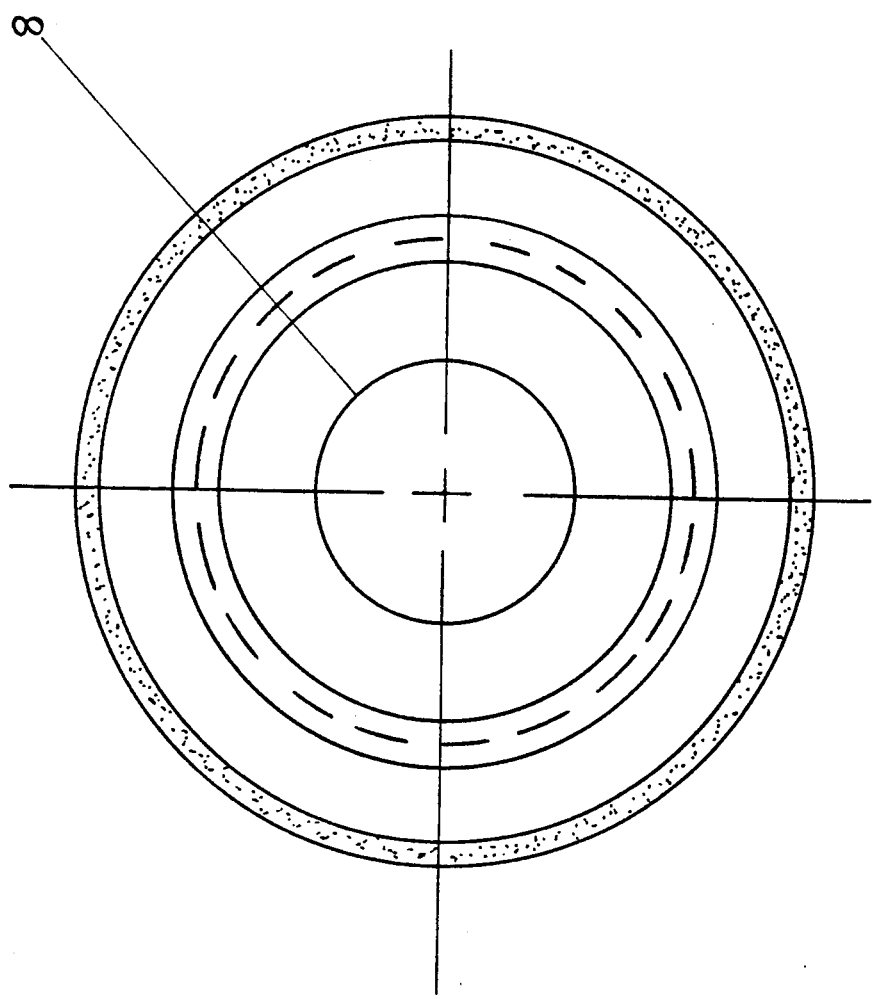

FIGS. 2A and 2B illustrate a thin annular abrasive cutting blade 4 attached to a hub 5. The hub material is made of plastic or other easily abraded material. The amount that the thin annular abrasive blade extends from the outer diameter of the hub 5 which is called the cutting edge or blade exposure 6. The portion or area of the hub diameter that will be abraded away is 7. The cutting edge or blade exposure 6 will increase in size as the portion of the hub 7 is abraded away. The cutting blade and hub assembly is mounted on a rotating spindle through arbor hole 8. The cutting edge or blade exposure 6 will increase in size as the portion of the hub 7 is abraded away. The cutting blade and hub assembly 4 and 5 is mounted on a rotating spindle through the arbor hole 8. The hub 5 will provide mechanical support to the cutting blade whe it is cutting.

FIGS. 3A, 3B and 3C illustrate a thin annular abrasive cutting blade 9 attached to a ring 10 made of plastic or other easily abradable material. The amount that the thin annular abrasive blade 9 extends from the outer diameter of the ring 10 is the cutting edge or blade exposure 11. The portion of the ring that can be abraded away is 12.

FIGS. 4A, 4B and 4C illustrate how the plastic or other easily abradable material of a hub or ring 27 can be abraded back to expose more of the cutting edge or blade exposure 21. The blade 22 and hub 23 assembly is made to penetrate and cut into an abrasive plate 24 by a predetermined amount 26. The blade and hub assembly are mounted on a rotating spindle shaft 25. The abrasive plate 24 contains abrasives that are of a hardness less than the abrasives in the cutting blade 22. When the rotating assembly comes in contact with the abrasive plate 24 the cutting blade will penetrate and cut a slot in the abrasive plate 24. The portion of the hub or ring 27 that is made of plastic or other easily abraded material will wear away when it comes in contact with the abrasive plate 24. In this manner, the cutting edge or blade exposure 21 will be increased to the amount shown by 26.

Having thus described my invention, I claim:

1. An abrasive cutting blade assembly comprising:
    an annular cutting blade having a circumferential cutting edge;
    a non-metallic circular means for structurally supporting the blade for rotation so that the circumferential cutting edge extends beyond the circumferential edge of the circular means to form a blade exposure in order to abrade a line into a workpiece;
    wherein the non-metallic circular means is abraded away to increase the blade exposure when the non-metallic circular means and the blade exposure are rotated and brought into contact with a solid abrasive material.

2. The cutting blade assembly of claim 1 wherein the means for structurally supporting the cutting blade comprises a hub attached to at least one side of the cutting blade, said hub extending inward from an inside diameter of the cutting blade to fit on a disc so the assembly can be mounted to a rotating spindle shaft.

3. The cutting blade assembly of claim 1 wherein the means for structurally supporting the cutting blade comprises a ring attached to at least one side of the cutting blade, said ring fitting onto a disc so the assembly can be mounted to a rotating spindle shaft.

4. The cutting blade assembly of claim 1, 2 or 3 wherein the means for structurally supporting the cutting blade is made of a plastic material.

5. The cutting blade assembly of claim 2 wherein the hub is attached to the cutting blade by glue.

6. The cutting blade assembly of claim 2 wherein the hub is molded to the cutting blade.

7. The cutting blade assembly of claim 2 wherein the ring is molded to the cutting blade.

8. The cutting blade assembly of claim 3 wherein the ring is attached to the cutting blade by glue.

* * * * *